UNITED STATES PATENT OFFICE.

RICHARD W. BAILEY, OF NEW YORK, N. Y.

IMPROVEMENT IN COMPOSITION FOR BLACKING STOVES.

Specification forming part of Letters Patent No. 116,533, dated July 4, 1871.

*To all whom it may concern:*

Be it known that I, RICHARD W. BAILEY, of the city, county, and State of New York, have invented a new, useful, and Improved Composition for Blacking Stoves and different kinds of hardware; and I do hereby declare that the following is a full and exact description thereof:

My invention is composed of plumbago, spirits of turpentine, asphaltum, alum, sassafras, and, if desirable, naphtha, mixed together in proper proportions so as to form a compound that may be applied to stoves, ranges, and all other hardware that requires to be polished with the kind of stove-blacking now in use; and, when so applied, the stoves, ranges and other hardware to which it may be applied become capable of receiving a high degree of polish of a lasting nature, without dust or dirt, and without any disagreeable and sickening odor, which is caused by the use of any stove-blacking now in use.

To enable others skilled in the art to make and use my said invention, I will proceed to describe the same.

First, I take a sufficient quantity of liquid asphaltum of about the consistency of ordinary black varnish, and dissolve in it about as much plumbago or black lead as the asphaltum will take up, thus forming a thick paste of about the consistency of freshly-made boot-blacking. I then add a sufficient quantity of naphtha to make the mixture of a consistency sufficiently thin to be easily applied with a brush. I next dissolve a convenient quantity of alum in a sufficient quantity of spirits of turpentine, and add this to the mixture for the purpose of causing the latter, when applied to any article to be polished, to become capable of receiving a brighter luster and retaining the same longer than any stove-blacking now in use. Lastly, I add any desirable quantity of sassafras oil, or any other desired flavoring oil or extract, for the purpose of preventing too rapid evaporation, and also to prevent the disagreeable and sickening odor consequent upon the use of the stove-blacking now in use, and also for the purpose of giving to my composition, when in use, an agreeable odor. I use the naphtha for the purpose of making the mixture thinner, giving an even and uniform polish to whatever it may be applied, and also to hasten drying.

When used in large quantities, as in manufactories, it should be made of a somewhat thicker consistency than when used in small quantities, as in families.

My invention will also enable iron, such as stoves and stove hardware, to which it has been applied to successfully resist the action of the weather.

Having thus described my invention, what I claim as new, and desire to secure by Letters Patent, is—

The improved composition, composed of the ingredients hereinbefore described, substantially as and for the purposes specified.

RICHARD W. BAILEY.

Witnesses:
ALEX. OSTRANDER,
C. M. VANDERVOORT.